United States Patent [19]

Sakamoto et al.

[11] 4,287,538
[45] Sep. 1, 1981

[54] MAGNETIC HEAD TRACKING CONTROL SYSTEM

[75] Inventors: Hitoshi Sakamoto, Zama; Yoshiaki Wakisaka, Atsugi, both of Japan

[73] Assignee: Sony Corporation, Tokyo, Japan

[21] Appl. No.: 73,246

[22] Filed: Sep. 6, 1979

Related U.S. Application Data

[63] Continuation-in-part of Ser. No. 14,764, Feb. 23, 1979.

[30] Foreign Application Priority Data

Sep. 7, 1978 [JP] Japan .................................. 53-110174

[51] Int. Cl.$^3$ ............................................... H04N 5/78
[52] U.S. Cl. ....................................... 360/10; 360/70; 360/77
[58] Field of Search ....................... 360/10, 11, 36, 77, 360/70, 73, 78; 358/8

[56] References Cited

U.S. PATENT DOCUMENTS 4,163,993  8/1979  Ravizza ................................... 360/10

*Primary Examiner*—James W. Moffitt
*Assistant Examiner*—Donald McElheny, Jr.
*Attorney, Agent, or Firm*—Lewis H. Eslinger; Alvin Sinderbrand

[57] ABSTRACT

In an apparatus for reproducing video or other information signals recorded in successive parallel tracks extending obliquely on a magnetic tape or other record medium which is adapted to be longitudinally advanced, a magnetic head or transducer is movable in the direction generally along the tracks for reproducing the signals recorded therein and is mounted or supported by a bi-morph leaf or other transducer deflecting device which is operative, in response to the reception of an electrical drive signal, for deflecting the transducer or head in a direction transverse to the direction along the tracks so as to follow a desired one of the tracks in moving from one end to the other end of such desired track, a first signal is produced in correspondence to the deflection of the transducer deflecting device needed to cause the transducer to follow the desired track at a predetermined position therealong, and a second signal is produced in correspondence to the following value:

$$-\tfrac{1}{2}n + \frac{(1-n)(100-d)}{100} + m$$

in which n is the ratio of the tape speed during reproducing to the tape speed during recording, d is percentage of the distance along each of the tracks from said one end thereof to said predetermined position therealong, and m is an integer that is no greater than n and no less than n-1. A control signal is produced on the basis of the relation between the foregoing first and second signals, and the resulting control signal is also applied to the transducer deflecting device for determining the next desired track to be followed by the transducer.

23 Claims, 18 Drawing Figures n=2.5
(FAST-PLAYBACK)

n=2.25
(FAST-PLAYBACK)

FIG.10
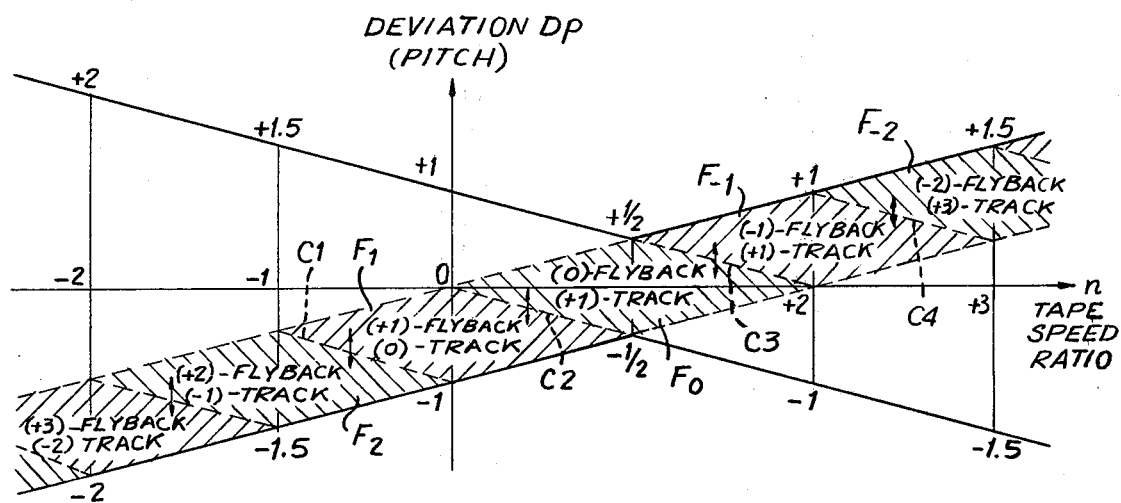
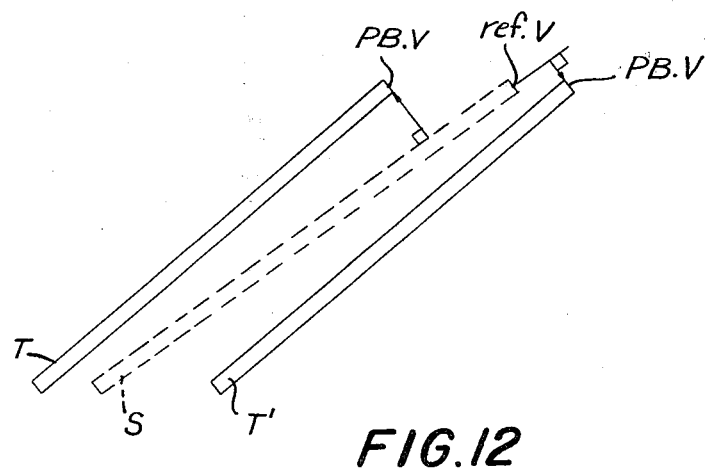
FIG.12

MAGNETIC HEAD TRACKING CONTROL SYSTEM

RELATION APPLICATION

This application is a continuation-in-part of our copending application Ser. No. 14,764, filed Feb. 23, 1979, and having a common assignee herewith, and the disclosure in such earlier filed application is incorporated herein by reference.

BACKGROUND OF THE INVENTION

1. Field of the Invention

This invention relates generally to apparatus, such as, a video tape recorder (VTR) of the so-called "helical-scan type", in which video or other information signals are recorded in successive parallel tracks which are skewed or extend obliquely on a magnetic tape, and more particularly is directed to an improved tracking control system by which a magnetic head or other transducer in such apparatus is made to accurately scan the track or tracks in which the video or other information signals are recorded.

2. Description of the Prior Art

In a helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During recording operation of the VTR, the angle between the scanning path, and hence each record track, and the longitudinal direction of the tape is dependent on the rotational speed of the rotary head and also the speed at which the magnetic tape is longitudinally advanced. Accordingly, if the speed and direction of advancement of the magnetic tape are not the same during the reproducing operation as during the recording operation, then the scanning path of the magnetic head during reproducing will not precisely follow or coincide with a record track on the tape during each movement of the head across the tape and, accordingly, the recorded video or other information signals may not be correctly or accurately reproduced.

Various tracking control or servo systems have been proposed for maintaining correct tracking or scanning of the record tracks by the rotary head. In the most desirable of these known arrangements, means are provided for deflecting the head in a direction normal to the plane of its rotation, that is, in a direction which is transverse in respect to the direction along each of the record tracks, and the amount of such deflection is electrically controlled during the movement of the head along each track so as to achieve accurate scanning of the latter. In published Japanese Patent Application No. 9919/1974 (Applicant: Matsushita Electric Industrial Company, Limited), it is generally disclosed to control the amount of deflection of the head in the direction normal to its plane of rotation in dependence on the difference between the speeds of advancement of the tape during the recording and reproducing operations so as to theoretically make possible the correct reproduction of the recorded video signals in the still-motion mode in which the tape is at rest, in the slow-motion mode in which the speed of advancement of the tape is, for example, ¼ or ½ the tape speed for the recording operation, and in the quick-motion mode in which the speed of advancement of the tape is substantially greater than, for example, 2 times, the tape speed, for the recording operation. Further, in Published Japanese Patent Application No. 117,106/1977 (Applicant: Ampex Corporation), it is disclosed to detect the amount of deflection of the head required for accurately scanning a record track thereby, and, when the detected deflection approaches the physical limit of that possible with the bi-morph leaf or other transducer deflecting device supporting the head, the electrical drive signal for the bi-morph leaf is controlled to cause the head to scan the next adjacent record track, that is, to effect a so-called "track jump". By reason of such "track jump" it is theoretically possible to effect correct slow-motion reproduction and also reverse-motion reproduction in which, for example, the tape is advanced longitudinally at the same speed as for the recording operation, but in the reverse or opposite direction.

However, in the existing tracking control or servo systems, the amplitude of the deflection of the rotary head or transducer by its transducer deflecting device is not optimized, that is, the maximum required deflection of the head in the non-normal reproduction modes, for example, the still-motion, slow-motion, fast-forward and reverse-motion modes, is not minimized. The foregoing tends to limit the permissible tape speed for reproducing in the fast-forward and reverse-motion modes, and to cause phase deviations or errors in the reproduced signals. Further, the failure to optimize the amplitude of the deflection of the rotary head or transducer by the bi-morph leaf or other transducer deflecting device disadvantageously decreases the durability of the transducer deflecting device and the speed and linearity of its response to the electrical drive or control signal therefor. Moreover, a circuit of undesirably large capacity is required for providing the electrical drive signal to the transducer deflecting device when the deflection amplitude is not optimized.

OBJECTS AND SUMMARY OF THE INVENTION

Accordingly, it is an object of this invention to provide an apparatus for reproducing information signals recorded in successive parallel tracks on a record medium with an improved tracking control system which avoids the above-described problems associated with the prior art.

More particularly, it is an object of this invention to provide a tracking control system, as aforesaid, by which information signals recorded in successive parallel tracks on a record medium can be correctly reproduced in the various non-normal reproducing modes, and in which the amount of deflection of the transducer deflecting device is optimized.

Another object is to provide a tracking control system, as aforesaid, by which, for each of the possible non-normal reproducing modes, the rotary head is made to scan or trace optimum tracks for maintaining the necessary deflection of the rotary head or transducer by its transducer deflecting device within an irreducible minimum deflection range.

A further object is to provide a tracking control system, as aforesaid, for improving the speed and linearity of the response of the bi-morph leaf or other transducer deflecting device to the electrical drive or control signal therefor.

According to an aspect of this invention, an apparatus for reproducing information signals recorded in successive parallel tracks on a record medium comprises transducer means movable along each of the tracks from one end to the other end thereof for reproducing the information signals recorded therein; transducer deflecting means for deflecting the transducer means in a direction which is transverse in respect to the direction along each of the tracks; means for supplying a drive signal to the transducer deflecting means so as to cause the transducer means to follow a desired one of the tracks in moving from one end to the other thereof; means for producing a first signal which corresponds to the deflection of the transducer deflecting means needed to cause the transducer means to follow the desired track at a predetermined position therealong; means for producing a second signal which corresponds to the below value $$-\tfrac{1}{2} n + \frac{(1 - n)(100 - d)}{100} + m$$

in which n is the ratio of the tape speed during reproducing to tape speed during recording, d is the percentage of the distance along each track from said one end thereof to said predetermined position therealong, and m is an integer that is no greater than n and no less than n-1; means for producing a control signal on the basis of the relation of said first and second signals; and means for applying said control signal to the transducer deflecting means so as to determine the starting position of the transducer means and, thereby, the next desired track to be followed by the transducer means.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 10 is a graph showing shared regions each representing necessary head flyback amplitude for track jump or track alteration;

FIG. 12 is a chart used for explaining the phase relationship between a reproduced vertical synchronizing signal and a reference vertical synchronizing signal;

DESCRIPTION OF THE PREFERRED EMBODIMENTS

Figure 1A:
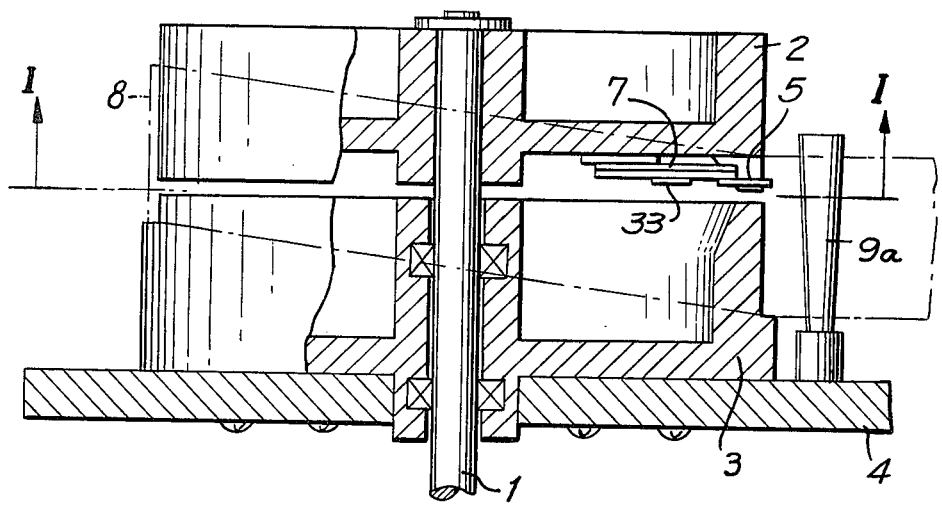
FIG. 1A is a side elevational view, partly in section, of a head drum assembly of a known video tape recorder (VTR) of the helical-scan type with which a tracking control system according to this invention may be employed.
Figure 1B:
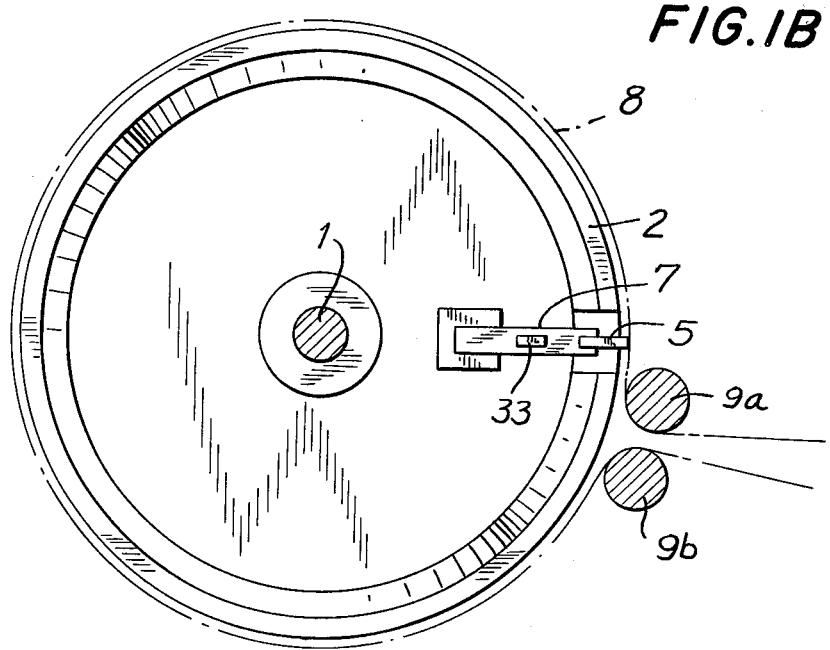
FIG. 1B is a cross-sectional view taken on the line I—I in FIG. 1A.

Referring to the drawings in detail, it will be seen that FIGS. 1A and 1B show a rotary head drum assembly of a known one-head VTR of the helical-scan type. The rotary head drum assembly is shown to include an upper rotary drum 2 which is rotated by a drive shaft 1 and a lower stationary drum 3 which is fixed on a chassis 4 of the VTR concentric with drive shaft 1 so as to be opposite upper drum 2 with a small gap therebetween. A magnetic head 5 is attached on the lower surface of upper drum 2 through a bi-morph leaf 7 that is an electromechanical transducer formed on piezoelectric elements. Head 5 rotates with upper drum 2 at a predetermined rotational speed and is deflected perpendicularly to its scanning path, or transversely with respect to the longitudinal direction of each recorded track, by means of the bi-morph leaf 7.

Figure 2:
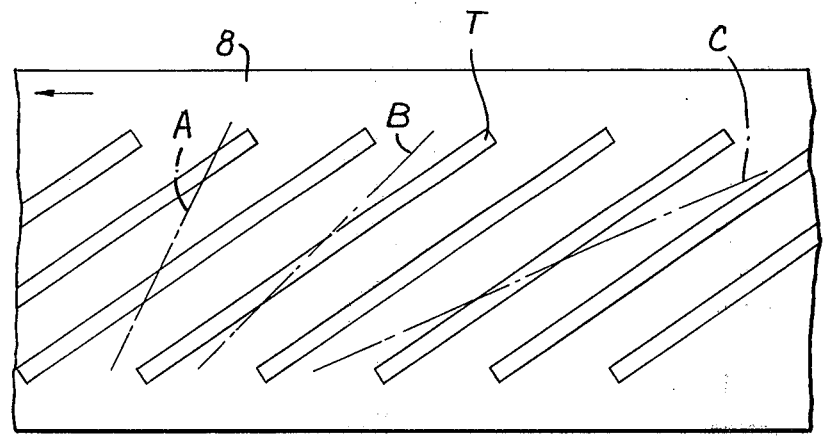
FIG. 2 is a plan view of a length of magnetic tape showing recorded tracks and head scanning paths for various playback or reproducing tape speeds.

A magnetic tape 8 is wrapped helically around the outer peripheries of upper drum 2 and lower drum 1 over an arc of almost 360° and is guided by tape guides 9a and 9b to form a so-called "Omega" loading format, as shown on FIGS. 1A and 1B. During recording operation, tape 8 is advanced longitudinally at a predetermined speed, so that video or other information signals are recorded by head 5 in a series of parallel magnetic tracks T at a predetermined slant angle to the longitudinal direction of the tape 8, as shown in FIG. 2.

In playback or reproducing operation with tape 8 being transported at the recording speed, an accurate video signal can be reproduced with a tracking servo system which includes a drum servo and/or capstan servo for adjusting the rotary phase of the head 5 so as to make the head correctly trace or scan the successive recorded tracks. In a playback mode employing an arbitrary tape speed which is different from the recording speed, both the phase and slant angle of the head scanning path do not coincide with the phase and slant angle, respectively, of the recorded track T. Some examples are shown on FIG. 2, in which dot-dash lines A, B and C respectively represent scanning paths of the head for reproducing in the reverse-motion, still-motion and 2.5/1 fast-forward motion modes.

Therefore, in the arbitrary speed playback mode, the vertical position of the head 5 must be changed by deflection of bi-morph leaf 7 in response to a control or drive signal so as to achieve initial phase error compensation and slant tracking error compensation. In addition to such compensations, it is necessary to effect tracing track selecting in order to perform overlap-tracing or interval-tracing. Overlap-tracing is required in a slow-motion playback mode employing a tape speed slower than the recording speed, and in which the head repeatedly traces or scans a recorded track and then the head scans the next track on the tape. Interval-tracing is required in a fast-motion playback mode employing a tape speed faster than the recording speed, and in which one or several tracks are skipped and the head only scans the tracks at intervals. Thus, when compensating for phase and slant errors, the optimum one of the recorded tracks must be traced to correctly effect such overlap-tracing or interval-tracing while ensuring that the vertical position of the head will not go beyond the smallest possible maximum permissible deflection for the tracking operation. The alteration of the track being traced from one track to the next desired one is hereinafter called "track jump".

Next, the condition for track jump, that is, the optimum condition to minimize the amplitude of head deflection or deviation, will be considered.

As noted above, tracking error compensation includes both a phase error compensation and a slant error compensation. In respect to the phase error compensation, when the head 5 is going to scan one of the paths A, B or C shown by dot-dash lines on FIG. 2, a maximum deflection of $\pm\frac{1}{2}$ pitch (one pitch is equal to the distance between adjacent record tracks) is the most that may be required to move the head onto the starting point of a recorded track to be traced. In other words, when the head is centered between adjacent tracks at the start of its scanning movement, the phase error is maximum and may be corrected by a $\pm\frac{1}{2}$ pitch deflection. If the arrangement is such that the head can be deflected to both sides of the track T by bi-morph leaf 7 which is controlled to selectively bend upward and downward from its neutral position shown in FIG. 1A, there a head deflection amplitude of one pitch, in its peak to peak value, is necessary for effecting the phase compensation irrespective of the tape speed during reproducing.

On the other hand, the slant compensation required to ensure that, once the head begins to trace a desired track, it will trace that one track from beginning to end, will vary in accordance with the tape speed. When the ratio of playback tape speed to the recording speed is represented by n, the required slant compensation is as follows:

$(n-1)$ pitch (in the case of $n \geq 1$)  (1)

or $(1-n)$ pitch (in the case of $n < 1$)  (2)

Consequently, a phase compensation of 1 pitch and a slant compensation of $(n-1)$ pitches may be required for correction of the scanning path of the head. Since the phase compensation has no relation to the playback tape speed, the phase and slant compensations are independent of each other. Thus, the necessary maximum amplitude P of the head deflection is represented by the sum of the compensation components as follows:

$P = [(n-1)+1]$ pitch for $n \geq 1$  (3a)

$P = [(1-n)+1]$ pitch for $n < 1$  (3b)

Figure 3:
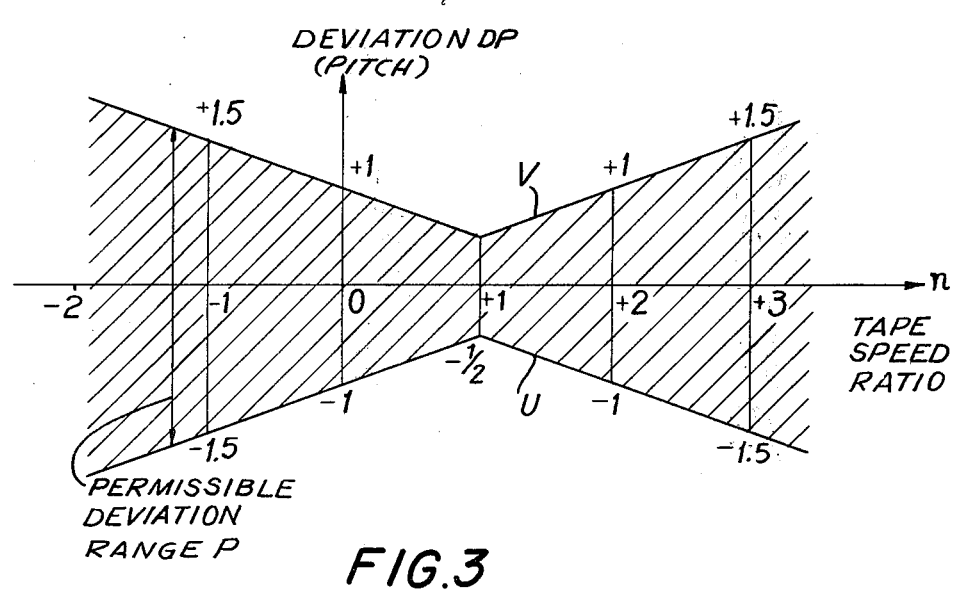
FIG. 3 is a graph showing the range of necessary maximum head deflections for various ratios n of the tape speed for reproducing to the tape speed for recording.

FIG. 3 shows the range of necessary maximum head deflections deduced from equations (3a) and (3b). As is apparent from FIG. 3, since the bi-morph leaf 7 is equally deflectable in the upward and downward directions, the deflection amplitude P of equations (3a) and (3b) may be equally distributed between an upper range and a lower range at opposite sides of a base surface (corresponding to the axis of abscissa of FIG. 3) on which bi-morph leaf 7 supporting the head is mounted. The upper boundary line V and the lower boundary line U of the range are represented by $P = \pm\frac{1}{2}[(n-1)+1]$ for $n \geq 1$  (4a)

or $P = \pm\frac{1}{2}[(1-n)+1]$ for $n < 1$  (4b)

The optimum deflection is achieved by bending bi-morph leaf 7 in the range defined between the upper and lower boundary lines V and U. The foregoing is a necessary condition to reduce the required deflection amplitude of the bi-morph leaf to the absolute minimum.

A method of controlling the track jump, which satisfies the necessary conditions of FIG. 3, will now be considered.

When the playback speed ratio n is an integer, intervaltracing, in which one or several recorded tracks are skipped, is effected with a track jump of n-pitches after each tracing or scan of a track. For example, in 2/1— fast-motion reproduction, tracing at intervals of 2-pitches or on alternate tracks is effected. Accordingly, when the playback speed ratio n is an integer, the "track jump pitch" or "trace pitch", that is, the distance between adjacent tracing tracks, may be represented by n pitches. However, when the speed ratio n is not an integer, for instance, if n is equal to 1 divided by an integer, one of the recorded tracks is repeatedly traced n-times, and then a track jump of one pitch, that is, to the next track, is effected. Therefore, when the speed ratio n is not an integer, the "track jump pitch" cannot be represented by n.

Since the head is not allowed to jump from one track to another in the middle of tracing or scanning a track, the track jump pitch is always an integral multiple of one pitch. Accordingly, when the speed ratio n is not an integer, n must be represented by two integers l and m as follows:

$$n = \frac{l \times X + m \times y}{X + y}$$  (5)

where l and m are determined by the inequality $(n+1) > l > m (n-1)$ and X and y are appropriate integers. The following table shows values of l and m obtained from equation (5) for various ranges of n:

TABLE
VALUES OF l AND m FOR VARIABLE n

| n range | l | m |
|---|---|---|
| $1 > n > 0$ | $l = 1$ | $m = 0$ |
| $2 > n > 1$ | $l = 2$ | $m = 1$ |
| $3 > n > 2$ | $l = 3$ | $m = 2$ |
| $0 > n > -1$ | $l = 0$ | $m = -1$ |
| $-1 > n > -2$ | $l = -1$ | $m = -2$ |

The numbers l and m represent the necessary track jump pitches and X and y represent the number of times the jumps of pitches l and m are respectively effected. The combination of the track jumps of pitches l and m carried out X-times and y-times, respectively, in each unit trace mode, serves to provide a track jump of n-pitches on the average, and thereby achieves playback at the speed ratio n.

For example, when n is equal to 2.5 for the 2.5/1-fast-motion playback mode, equation (5) leads to l=3, m=2, X=1 and y=1. As illustrated on FIG. 4A, in that case, the tracking operation is performed by carrying out alternate single track jumps of 3-pitches and 2-pitches. Thus, for the 2.5/1 fast-motion playback mode in which n=2.5, each cycle of the tracking operation involves two scans during which there is a track jump of 3-pitches and then a track jump of 2-pitches, respectively, leading to a total track jump of 5-pitches for two track jumps, or an "average" track jump of 2.5 pitches.

When n is equal to 2.25, equation (5) leads to l=3, m=2, X=1 and y=3. As shown on FIG. 4B, in that case, each cycle of the tracking operation involves a single track jump of 3-pitches and then, a track jump of 2-pitches which is repeated 3-times. In this case, each cycle of the tracking operation achieves a total track jumps of 9-pitches in 4 track jumps leading to an "average" track jump of 2.25 pitches.

Therefore, in the arbitrary speed playback, predetermined numbers of track jumps of l pitches and m pitches are carried out to achieve the desired tracking operation. In certain particular cases, when the playback speed ratio n is an integer or $|n|<1$, l or m becomes zero. The actual amounts of head deflection needed to effect the track jumps of l pitches and m pitches are $l-1=m$ pitches and $m-1$ pitches, respectively, as the head jumps from the concluding end of a track being scanned to the starting end of a next track to be scanned, and the vertical positions of the concluding and starting ends of adjacent recorded tracks agree with each other on the peripheral surface of the head drum assembly. In other words, in the absence of any deflection of the head by its supporting bi-morph leaf, a so-called track jump of 1-pitch is effected as the head moves from the concluding end of one track to the starting end of the next track.

The head deflections of $l-1=m$ pitchs and $m-1$ pitches are hereinafter called an "m-jump" and "(m−1)-jump", respectively. The larger one of the m-jump and (m−1)-jump, considered in absolute values thereof, is referred to as the "large jump" and the smaller one is referred to as the "small jump", from which it follows that the m-jump is the large jump in the case of n>1 and the (m−1)-jump is the large jump in the case of n<1.

Figure 4A:
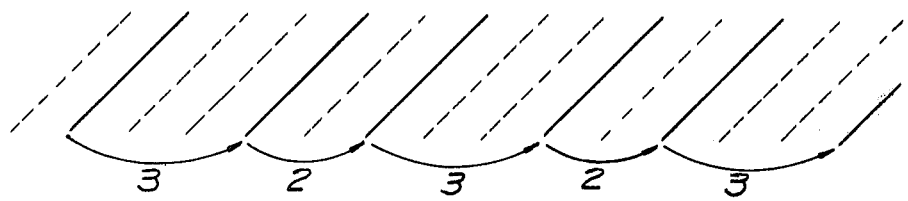
FIGS. 4A and 4B are diagrammatic illustrations showing the tracks which are traced and the tracks which are jumped in the fast-forward reproducing mode when the reproducing mode when the reproducing tape speed is 2.5 and 2.25 times, respectively, the recording tape speed.
Figure 4B:
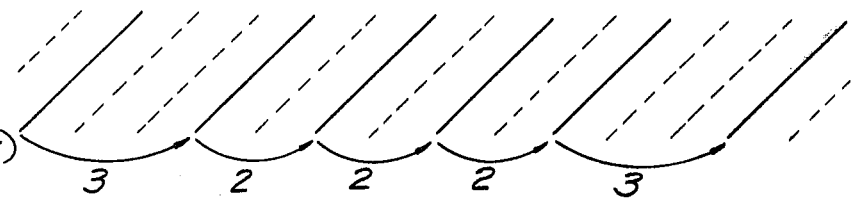

Next, consideration will be given to the sequence or condition of the track jumps needed to maintain deflection of the head within the range shown in FIG. 3. As shown in FIGS. 4A and 4B, after a large jump or small jump is carried out to move the head onto the beginning or starting end of a desired recorded track, the head scans such track while the slant compensation of $|n-1|$ pitches is effected. The deflections of the bi-morph leaf for the track jump and the slant compensation are carried out in opposite directions from each other.

Figure 5:
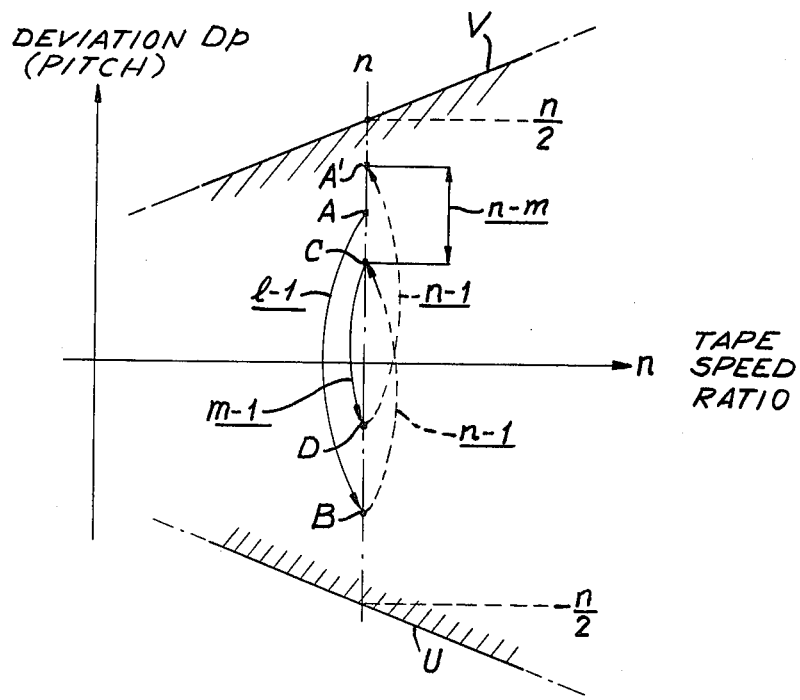
FIG. 5 is a graph illustrating the deflecting motion of the head when the ratio of tape speed for reproducing to the tape speed for recording is n.

FIG. 5 illustrates the deflecting motion of the head when the playback tape speed ratio n is, for example, 2.5. The ordinate of the graph of FIG. 5 represents head deviation $D_p$ in units of pitch. When the head is at the point A at the concluding end of a recorded track, a large jump of (l−1) or m pitches is carried out to deflect the head onto the beginning end of the next desired track to be traced, that is, the head is deflected to the point B, as shown by a solid line on FIG. 5. Then, the head traces the track while the (n−1)-slant compensation is effected, as shown by a dotted line. At the concluding end of the track, the head has been deflected to the point C. After that, a small jump of m−1 pitches is carried out as indicated by a solid line, to deflect the head to the point D which is at the beginning end of the next desired track to be traced. Then, the head traces the last mentioned track while the (n−1)-slant compensation is effected, as shown by a dotted line, to the concluding end of the track where the deflected head is at the point A. The foregoing represents the deflecting cycle, and such sequential deflecting operations are repeated.

The deflecting motion of the head shown on FIG. 5 corresponds to the trace mode shown on FIG. 4A, and in which the large jump (3-pitches) and the small jump (2-pitches) are carrier out alternately. In other trace modes wherein the small jump or large jump is repeated several times, for example, as shown in FIG. 4B, the small jump (or large jump) and the subsequent trace are repeated several times to reach the deflection point A.

In determining the deflecting cycle, the below conditions (1) and (2) have to be observed:

Condition (1)

When the large jump, for example, from point A to point B, is carried out, point B must not be beyond the lower boundary line U of FIG. 3 or FIG. 5. The deflection for the large jump is $l-1=m$ pitches when the speed ratio n is greater than 1, the large jump is permissible only when the point A at which the head is situated before the large jump, is above a position that is $l-1$ or m pitches from the lower boundary line U. If the deviation of the head from its neutral or undeflected position before the large jump is represented by $D_p$(pitches), the head is deflected by the large jump to a point represented by $(D_p-m)$ pitches and which must be above the lower boundary line U. Thus, $$(D_p - m) > \text{line } U \text{ or } (D_p - m) > -\tfrac{1}{2}n$$

so that, $$D_p > -\tfrac{1}{2}n + m \qquad (6)$$

The above inequality (6) gives a condition necessary for the large jump in the case of n>1.

As for the slant compensation of (n−1) pitches necessary for proper tracing after the large jump, (n−1) is seen to be less than (l−1) from equation (5). Accordingly, if the deviation $D_p$ of point A before the large jump satisfies the above inequality (6), the deviation at the end of tracing, for example, at point C, is never beyond the permissible range.

In the case of n<1, the large jump is effected by a deflection of (m−1) pitches, where m is a negative integer. Thus, in the same manner as above, the head is deflected by the large jump from point $D_p$ to a point $(D_p−m+1)$ pitches, which must be below the upper boundary line V. Thus, $$(D_p-m+1) < \text{line } V \text{ or } (D_p-m+1) < (-\tfrac{1}{2}n+1)$$

so that, $$D_p < -\tfrac{1}{2}n+m \qquad (7)$$

Condition (2)

For the small jump, for example, from the point C to the point D, the deflection is equal to (m−1) pitches, in the case of n>1. The slant compensation of (n−1) pitches which has been effected before the small jump is greater than the deflection of (m−1) pitches for the small jump, so that the point D after the small jump is never beyond the point B at the beginning of the tracing before the small jump.

As the slant compensation of (n−1) pitches necessary for the tracing after the small jump is greater than the small jump deflection of (m−1) pitches, care must be taken that the deviation at the end point A′ of the tracing is not beyond the upper boundary line V. The distance between the points C and A′ is equal to (n−m) pitches. Consequently, the small jump is permissible only when the deviation point C before effecting the small jump is situated below a position that is (n−m) pitches distant from the upper boundary line V. If the head is positioned at a point $D_{P}'$ before the small jump, the head is deflected by the small jump and the following tracing to the point $D_P-(m-1)+(n-1)$ which must be below the line V. Thus, $$D_P-m+n < \text{line } V \text{ or } D_{P}'-m+n < \tfrac{1}{2}n$$

so that, $$D_P < -\tfrac{1}{2}n+m \qquad (8)$$

The above inequality (8) gives a condition necessary for the small jump in the case of n>1.

In the case of n<1, the small jump is effected by a deflection of pitches. Thus, in the same manner as above, it can be determined that after the small jump and the subsequent tracing, the head is at the point $D_P-m+(n-1)$, which must be above the lower boundary line U. Thus, $$D_P-m+n-1 > \text{line } U \text{ or } D_P-m+n-1 > \tfrac{1}{2}n-1$$

so that, $$D_P > -\tfrac{1}{2}n+m \qquad (9)$$

As a result, a group of boundary lines defining the conditions for changeover between the large jump and the small jump are expressed as follows:

$$D_P = -\tfrac{1}{2}n+m \qquad (10)$$

where m is an integer give by the condition of n≧m≧n−1. The boundary lines are shown by dotted lines in FIG. 6, and are seen to be distant by (1−1) pitches, that is, the deflection for the large jump when n>1, from the lower boundary line U or distant by (m−1) pitches, that is, the deflection for the large jump when n<1, from the upper boundary line V. Therefore, hatched, triangular regions satisfy the above inequalities (6) and (7). Thus, when the head is deviated or deflected to lie in the hatched regions at the concluding end of a track being scanned, a large jump must be effected to reset the head to the beginning end of the next desired track.

Figure 6:
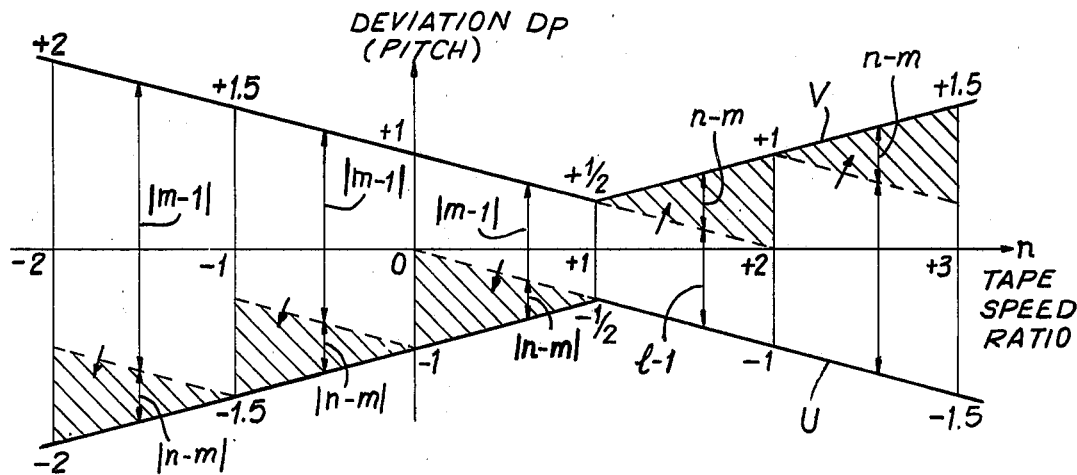
FIG. 6 is a graph showing a group of boundary lines for determining the head jump or flyback condition.

The dotted boundary lines in FIG. 6 are also distant by (n−m) pitches from the upper and lower boundary lines V and U for n>1 and n<1, respectively. Therefore, the regions except the hatched regions in the permissible range between lines U and V satisfy the above inequalities (8) and (9).

Therefore, the dotted lines in FIG. 6 define the boundaries for determining whether a large jump or a small jump is next required. When the head deviation point at the concluding end of a traced track crosses one of the boundaries in the direction shown by arrows on FIG. 6, a large jump is required, and when the head deviation point does not cross one of the boundaries, a small jump is required. If the foregoing conditions are observed, the head deflection never exceeds the maximum, permissible range of FIG. 3, which minimizes the head deviation or deflection of the bi-morph leaf.

Figure 7:
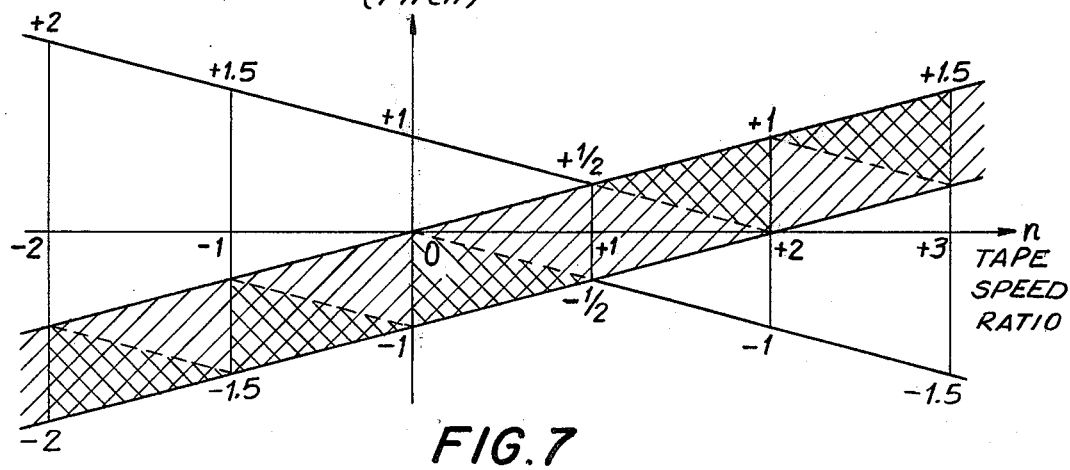
FIG. 7 is a graph similar to that of FIG. 3, but in which the necessary head deflections for various ratios n are broken down into components for compensating for initial phase errors and for compensating for slant scanning errors, respectively.

The jump conditions of FIG. 6 may be considered from another point of view. More particularly, FIG. 7 shows a graph in which the necessary maximum amplitude of head deflection shown on FIG. 3 is broken down into its two components, namely, a component for the phase compensation (+½ pitches) and a component for the slant compensation (n−1 pitches). In FIG. 7, the phase compensation component of +½ pitches, that is, a deflection of one pitch from peak-to-peak, is shown by a hatched portion. The remaining portion or region corresponds to the slant compensation component. Further, if the hatched regions of FIG. 6 each of which is called as "fraction-region" and has a varying range of (n−m), are overlapped on FIG. 7, the resulting cross-hatched "fraction-regions" are completely contained within the hatched portion. Accordingly, it is apparent that the phase error caused by the fraction (n−m) can be covered by the phase compensation.

The above equation (10) represents boundaries to judge the jump to be effected on the basis of the head deviation at the point just before a track jump, that is, at the concluding end of a traced track. When it is required to judge the jump to be effected on the basis of the head deviation at any other point along a scanned track, for example, at a point distant by d percent from the beginning end of the track being traced or scanned before the jump, the remaining slant compensation, defined by [(n−1)(100−d)]/100, must be subtracted from the expression for $D_P$ in equation (10). Accordingly, the general expression for the boundaries is changed as follows:

$$D_P = -\tfrac{1}{2}n + \frac{(1-n)(100-d)}{100} + m \qquad (11).$$

Figure 8:
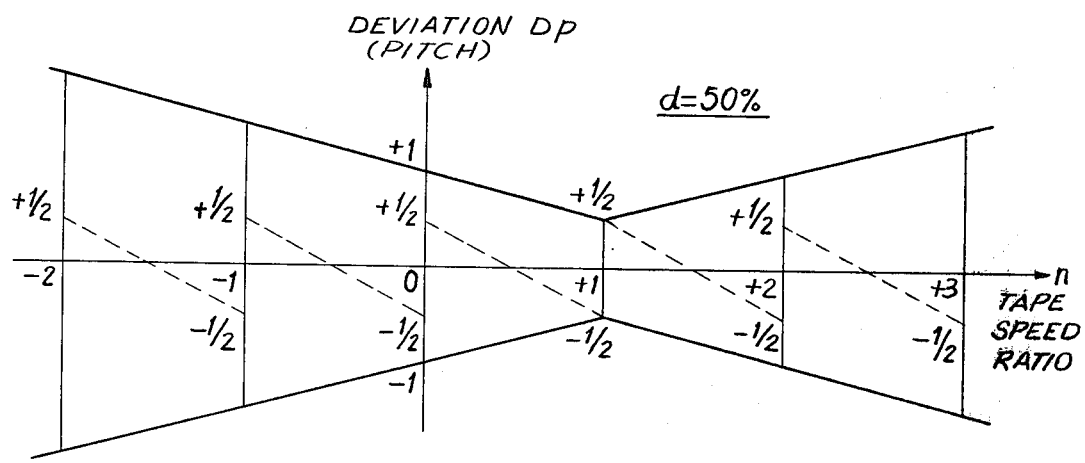
FIG. 8 is a graph similar to that of FIG. 6, but showing another group of boundary lines for determining the head jump or flyback condition on the basis of the head deflection at a position which is distant by d=50% of the track length from the first or starting end of a scanning track.
Figure 9:
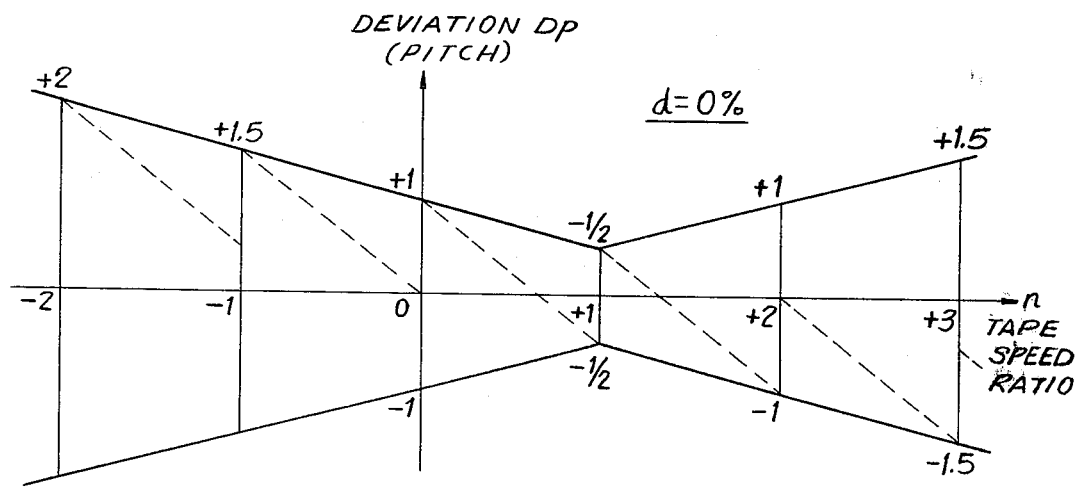
FIG. 9 is a graph similar to FIG. 8, but for d=0%.

FIG. 8 is a graph showing a group of boundaries (dotted lines) for judging the jump (large or small) to be effected on the basis of the head deviation at a point along the track being scanned which is spaced by 50% of the track length from the beginning or starting end of the track. In other words, FIG. 8 is a view similar to that of FIG. 6, but in which the basis is the deviation or deflection of the head when at the middle of the track being scanned, rather than at the concluding end of such track. FIG. 9 is another grain similar to that of FIG. 8, but showing boundaries in dotted lines for judging whether to effect a large jump or a small jump on the basis of the deflection of the heat at the commencement of a scanning path or track.

The judgement on the basis of head deviation at the concluding end of a track being scanned is advantageous for the tracking operation in the case of an abrupt change in the playback situation, for example, an abrupt change in the tape speed. It is, however, disadvantageous in that only a relatively short time is available for the jump or flyback movement of the head between the scanning of the concluding end of one track and the scanning of the beginning of the next desired track.

Referring now to FIG. 10, it will be seen that the graph thereon shows shared regions each representing the necessary head flyback amplitude for the track jump which is judged as to its condition (large jump or small jump) on the basis of the head deviation at the concluding end of the track being scanned.

As shown in FIG. 5, after a large jump (from A to B) or a small jump (from C or D), the next desired track is traced with the head being deflected by the slant compensation of $(n-1)$ pitches. The head deviation at the judging point (C or A') always comes in a region, such as, one of the hatched regions $F_2$, $F_1$, $F_0$, $F_{-1}$, $F_{-2}$— on FIG. 10, which is spaced from the lower boundary line by $(n-1)$ pitches for $n \geq 1$, or spaced from the upper boundary line by $(1-n)$ pitches for $n-1$. The deviation of the judging point, that is, the deflection of the head at the concluding end of a track being scanned, varies within a respective one of the regions $F_2$, $F_1$, $F_0$, $F_{-1}$, $F_{-2}$, etc. depending on the tape speed and direction, that is, the value of n.

In the case of $n > 1$, when the judging point comes across one of the boundary lines defined by equation (10), as at $C_3$ or $C_4$ on FIG. 10, in the direction toward the adjacent upper triangular region, for example, when the judging point crosses line $C_3$ in the direction from $F_0$ toward $F_{-1}$, a large jump of $(1-1)$ or m pitches should be carried out to reset the head. When the judging point comes across the boundary line toward the adjacent lower triangular region, for example, across the line $C_3$ toward region $F_0$, a small head jump of $(m-1)$ pitches is carried out to reset the head. In the case of $n < 1$, a large jump is effected to reset the head when the judging point comes across one of the boundary lines $C_1$ or $C_2$ in the direction toward the adjacent lower triangular region, and a small jump is effected when the judging point comes across the line $C_1$, or $C_2$ in the direction toward the adjacent upper triangular region.

The deflections of the head by m pitches and $(m-1)$ pitches, respectively, for the large jump and the small jump are shown on FIG. 10 as "flyback" amplitudes in terms of the respective numbers of pitches with a positive or negative sign attached to each. Pairs of horizontally adjacent triangular regions on FIG. 10 have the same flyback amplitudes as each other, and are combined to form the diamond-shaped regions $F_2$, $F_1$, $F_0$, $F_{-1}$, $F_{-2}$, etc. The positive and negative signs represent the direction of the flyback movement of the head. The positive sign indicates that the bi-morph leaf 7 in FIG. 1A is bent or deflected upward by the prescribed number of pitches and the negative sign indicates that the bi-morph leaf 7 is bent downward by the prescribed number of pitches. "(0) flyback" means that the track jump to reset the head on to the beginning of the next desired track is performed without any flyback movement or deflection of the bimorph leaf but automatically with the tape running. Each of the numbers in parentheses next to the legend "track" on FIG. 10 indicates the number of pitches to a next desired track, that is, the "trace pitches" for the respective trace mode.

A head tracking control circuit which performs the above-described tracking operation will now be described with reference to FIG. 11.

Figure 11:
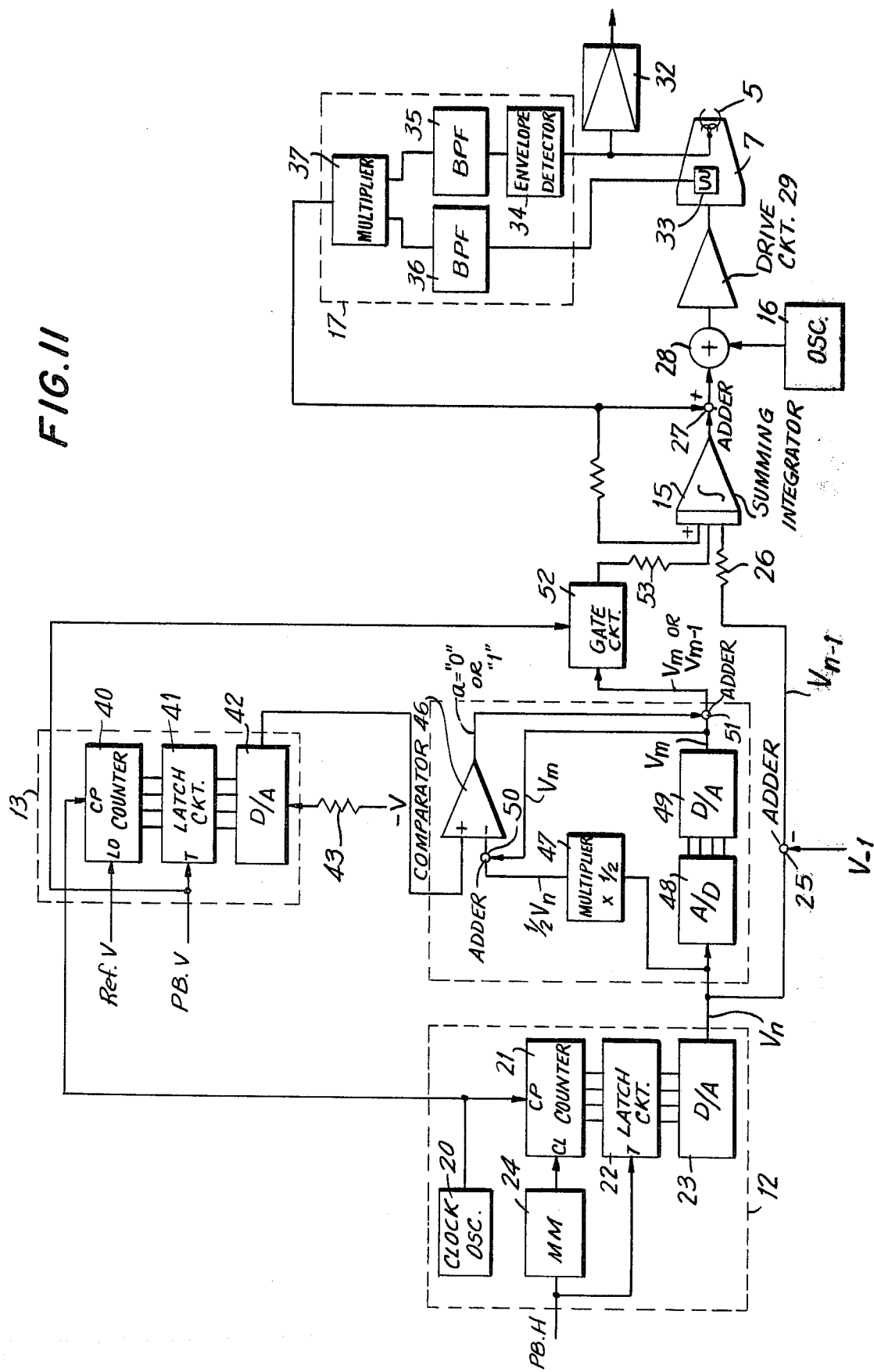
FIG. 11 is a block diagram of a head tracking control circuit according to an embodiment of this invention.

The tracking control circuit of FIG. 11 generally includes a tape speed detecting circuit 12, a head deviation detecting circuit 13, a flyback voltage forming circuit 14, an integrator 15 and an error signal forming circuit 17.

The frequency or period of the horizontal synchronizing signal in the reproduced video signal varies in accordance with the playback tape speed. The reason is that the relative speed between the head and the recorded track on the tape changes in accordance with the tape speed, which results in a variation of the frequency of the reproduced horizontal synchronizing signal. Although the head scanning path is corrected by deflection of the bi-morph leaf to effect the slant compensation, such compensation never causes frequency variation of the horizontal synchronizing signal as the head is deflected by the bi-morph leaf transversely with respect to the scanning path. Thus, the tape speed ratio n can be detected from the frequency of the reproduced horizontal synchronizing signal.

In FIG. 11, the reproduced horizontal synchronizing signal PB.H which is suitably separated from the output of head 5 is supplied to the tape speed detecting circuit 12. The detecting circuit 12 includes a clock pulse generator 20 for generating clock pulses of a predetermined frequency, a counter 21 for counting the clock pulses, a latch circuit 22 for holding the output of the counter for a predetermined period and a digital-to-analog (D/A) converter 23.

The clock pulse generator 20 generates clock pulses of a suitably high frequency, for example, 14 MHz. The clock pulses are supplied to a clock terminal CP of counter 21, which counts the clock pulses at horizontal scanning intervals. A reset pulse of a predetermined width synchronized with the reproduced horizontal synchronizing signal is supplied to a reset or load terminal R of counter 21 through a monostable multivibrator 24 to reset the counter. The output of counter 21 is supplied to latch circuit 22. As the reproduced horizontal synchronizing signal is supplied to a trigger terminal T of latch circuit 22, the output of counter 21 is read in the latch circuit 22 just before counter 21 is reset, and such output of counter 21 is held in latch circuit 22 for a time interval until the next horizontal synchronizing signal. The output of latch circuit 22 is supplied to digital-to-analog converter 23 which provides a voltage output signal $V_n$ corresponding to the tape speed ratio n. A bias voltage $V-1$ corresponding to the tape speed ratio of $n=-1$ for the reverse mode of reproduction is added to the voltage signal $V_n$ in an adder 25 to form the voltage $V_n-1$ which corresponds to the slant compensation factor or component $(n-1)$.

The voltage signal $V_n-1$ is supplied through a resistor 26 to one of the inputs of summing integrator 15 which provides, as its output, a ramp voltage having a predetermined slant corresponding to the slant compensation. The ramp voltage is supplied to a drive circuit 29 through adders 27 and 28. A signal for wobbling or dithering the bi-morph leaf 7 at a predetermined frequency $f_0$ is supplied from an oscillator 16. Thus, the drive circuit 29 provides, as its output, a ramp voltage on which the wobbling or dithering signal is superposed. The bi-morph leaf 7 is driven in response to the output of drive circuit 29, so that the scanning path of head 5 is corrected by the slant compensation to follow a desired track even though the tape running speed for reproducing does not equal the recording tape speed, and the head is wobbled transversely with respect to the longitudinal direction of the scanning path.

As a result, the RF or FM signal reproduced by the head 5 is subjected to an amplitude modulation at the wobbling frequency $f_0$. The reproduced RF signal from the head 5 is fed to a video signal reproducing system (not shown) through an amplifier 32 and is also supplied to the error signal forming circuit 17. The bi-morph leaf 7 is provided with a strain gauge 33 on one of the surfaces thereof, for detecting the deflection thereof. The output of strain gauge 33 is fed to error signal forming circuit 17.

The error signal forming circuit 17 is shown to include an envelope detecting circuit 34, band-pass filters 35 and 36 and a multiplier 37. The reproduced RF signal is supplied from head 5 to envelope detecting circuit 34, from which an amplitude-modulation component included in the RF signal is obtained. The output of detecting circuit 34 includes information regarding the amount and direction of the tracking error of the actual scanning path relative to the recorded track, and also partially includes amplitude-modulated components due to undesirable mechanical vibrations, such as, resonant and transient vibrations. The output of detecting circuit 34 is supplied to one input of multiplier 37 through band-pass filter 35. Another input of multiplier 37 receives the output of strain gauge 33 through band-pass filter 36. The output of strain gauge 33 includes the frequency component $f_O$ of the wobbling signal and the mentioned undesired mechanical vibrations, both of which serve as the modulating wave for the amplitude modulation and do not include any information with regard to the tracking error. Therefore, correlation between the modulating wave (the output of the strain gauge 33) and the modulated wave (the output of the detecting circuit 34) is considered in multiplier 37 which functions as a synchronous detector. The in-phase components ($f_O$-component and the undesired mechanical vibration component) included in both inputs to multiplier 37 are eliminated therethrough and only the tracking error signal is detected therefrom. The tracking error signal is added to the ramp voltage from integrator 15 in the adder 27. As the result, the phase deflection amplitude of the bi-morph leaf 7 is controlled so that the scanning path of the head 5 coincides with the recorded track.

When the tracking or scanning of a recorded track is finished, a head flyback motion or reset motion is imparted to the bi-morph leaf 7 so as to reset the head to the beginning of a next desired track in accordance with the track jump condition. The track jump condition is decided on the basis of an output $V_d$ of the head deviation detecting circuit 13, which detects the head deviation amount at the concluding end of a track being scanned or traced. The output $V_d$ of detecting circuit 13 is fed to the flyback voltage forming circuit 14, which operates in accordance with the flyback-conditions shown on FIG. 10.

The head deviation amount or distance from the netural position of the head may be detected by measuring the phase difference between the reproduced vertical synchronizing signal BP.V and en external reference vertical synchronizing signal Ref.V. As shown on FIG. 12, if the head were fixed at its neutral position, for example, by excluding the control signal from the bi-morph leaf 7, the head would scan along a scanning path S indicated in dotted lines and which has a slant in accordance with the tape running speed. The reference vertical synchronizing signal Ref.V appears at a time corresponding to the head reaching the concluding end of the scanning path. The signal Ref.V may be formed by a rotational phase detector associated with the rotary upper drum 2.

When a control singal applied to the bi-morph leaf 7 causes the head to trace the recorded track T or T' by performing the slant compensation and the phase compensation, the head is deflected transversely with respect to the scanning path S. Thus, the phase of the reproduced vertical synchronizing signal PB.V at the concluding end of the track T leads with respect to the phase of the reference signal Ref.V by an amount proportional to the head deviation. Conversely, the phase of the signal PB.V at the concluding end of the track T' lags with respect to the phase of the signal Ref.V. Thus, the amount and direction of the head deviation can be determined by detecting the phase of the reproduced vertical synchronizing signal PB.V with respect to the reference vertical synchronizing signal Ref.V.

Returning to FIG. 11, it will be seen that the head deviation detecting circuit 13 includes a counter 40 for counting the output pulses of clock pulse generator 20, a latch circuit 41 for holding the output of counter 40 and a digital-to-analog converter 42 for changing the output of latch circuit 41 to an analog value or voltage $V_d$. The output of clock pulse generator 20 is supplied to a clock terminal CP of counter 40, and a load terminal LO of the counter receives the reference vertical synchronizing signal Ref.V to load or offset the counter 40 with a predetermined value which is a central value corresponding to the phase of the reference signal Ref.V. The counter 40 counts the positive or negative phase difference between the reference signal Ref.V and the reproduced signal PB.V on the basis of the clock pulse.

The output of counter 40 is supplied to latch circuit 41 which, at a trigger terminal T, receives the signal PB.V. Thus, the output or count of counter 40 is read in latch circuit 41 at the reproduced signal PB.V and indicates the phase difference. The output of latch circuit 41 is provided to the digital-to-analog converter 42, in which the voltage signal $V_d$ corresponding to the phase difference, that is, the deviation $D_p$ of the head, is formed. The digital-to-analog converter 42 is provided with a bias voltage $-V$ through a resistor 43 to offset the output thereof so that the voltage signal $V_d$ becomes zero when the phase difference between Ref.V and PB.V is zero. The voltage signal $V_d$ is fed to the flyback voltage forming circuit 14.

The flyback voltage forming circuit 14 is shown to include a comparator 46, a multiplier 47, an analog-to-digital converter 48 and a digital-to-analog converter 49, as shown in FIG. 11. The voltage signal $V_n$ corresponding to the tape speed ratio n is supplied to A/C converter 48 from tape speed detecting circuit 12. The digital value obtained from the A/D converter 48 is fed to the D/A converter 49, which provides, as its output, a voltage signal $V_m$ corresponding to the integer m determined by the condition $n \geq m \geq n-1$. The voltage $V_m$, when applied to bimorph 7, can deflect the head 5 by m pitches. The voltage $V_m$ is supplied to an adder 50 in the negative polarity $(-V_m)$ so as to be substracted from the output of multiplier 47.

The voltage signal $V_n$ representing the speed ratio n is supplied to the multiplier 47 which multiplies by $\frac{1}{2}$ so that an output $\frac{1}{2}$ is produced. Thus, adder 50 provides an output voltage signal $\frac{1}{2} V_n - V_m$ corresponding to a head deviation of $(\frac{1}{2}n-m)$ pitches. The voltage signal $\frac{1}{2} V_n - V_m$ is supplied to an input terminal $(-)$ of comparator 46 which, at its other input terminal $(+)$ receives the voltage signal $V_d$ from circuit 13 representing the head deviation. In comparator 46, the voltages $V_d$ and $-\frac{1}{2}V_n + V_m$ are compared with each other. The output a of comparator 46 has the below two states or values:

(1) $a=1$ when $V_d < -\frac{1}{2}V_n + V_m$
(2) $a=0$ when $V_d > -\frac{1}{2}V_n + V_m$ Thus, the comparator 46 judges whether or not the head deviation $D_p$ at the concluding end of a tracing track has passed one of the boundaries expressed by equation (10) and which is shown by the dotted lines in FIG. 6. For example, in a playback mode employing a tape speed ratio n within the range from 1 to 2, the existence of state (1) of output a shows that the head deviation at the judging point is in the triangular region $F_O$ of FIG. 10, and the existence of state (2) shows that the head deviation is in the triangular region $F_{-1}$.

Output a of comparator 46 is supplied to an adder 51 with negative polarity and with a level corresponding to a head deflection of one pitch when $a=1$. The output $V_m$ of D/A converter 49 is also supplied to adder 51 so that the output of adder 51 is a voltage signal $V_{m-1}$ in state (1), that is, when $a=1$, and another voltage signal $V_m$ is obtained in state (2) or when $a=0$. The voltage signals $V_{m-1}$ and $V_m$ correspond to the flyback pitch $m-1$ (small jump) and the flyback pitch m (large jump), respectively. The voltage signal $V_{m-1}$ or $V_m$ is supplied as a flyback signal to integrator 15 through an analog gate circuit 52 and a resistor 53. The gate circuit 52 is controlled by the reproduced vertical synchronizing signal PB.V so that gate 52 passes the signal therethrough for an instant, for example, 1 msec., after scanning of a track is finished. The time constant for the integration effected in integrator 15 with respect to the flyback signal is made substantially smaller than that with respect to the signal $V_{n-1}$ from adder 25 corresponding to the slant compensation factor $n-1$. The time constants for the integration are determined by the resistances of the resistors 26 and 53.

As a result, the bi-morph leaf 7 is deflected by the ramp voltage corresponding to the slant compensation $n-1$ and thereafter files back or jumps by the prescribed number of pitches at the reproduced vertical synchronizing signal.

Figure 13:
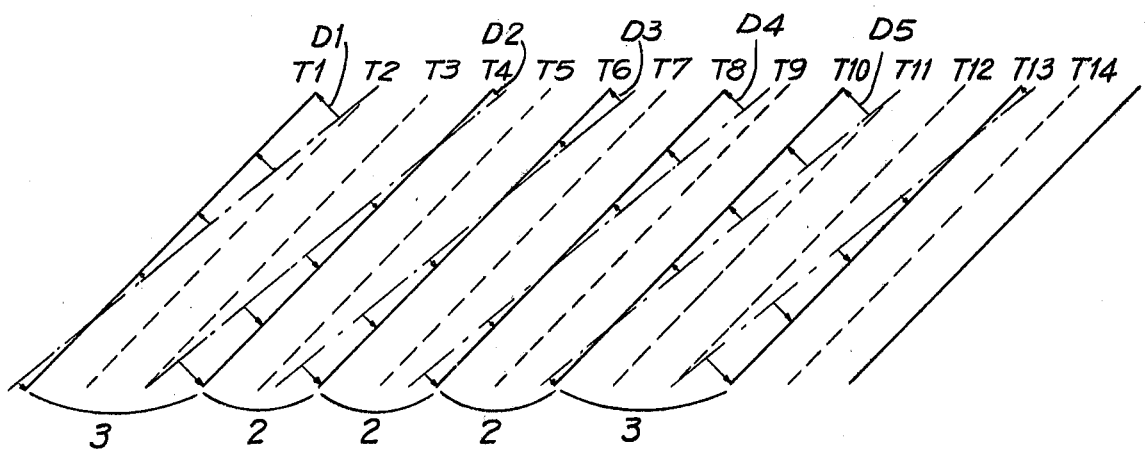
FIG. 13 is a chart showing the tracking mode for a fast-forward reproducing mode with the tape speed ratio n=2.25.
Figure 14:
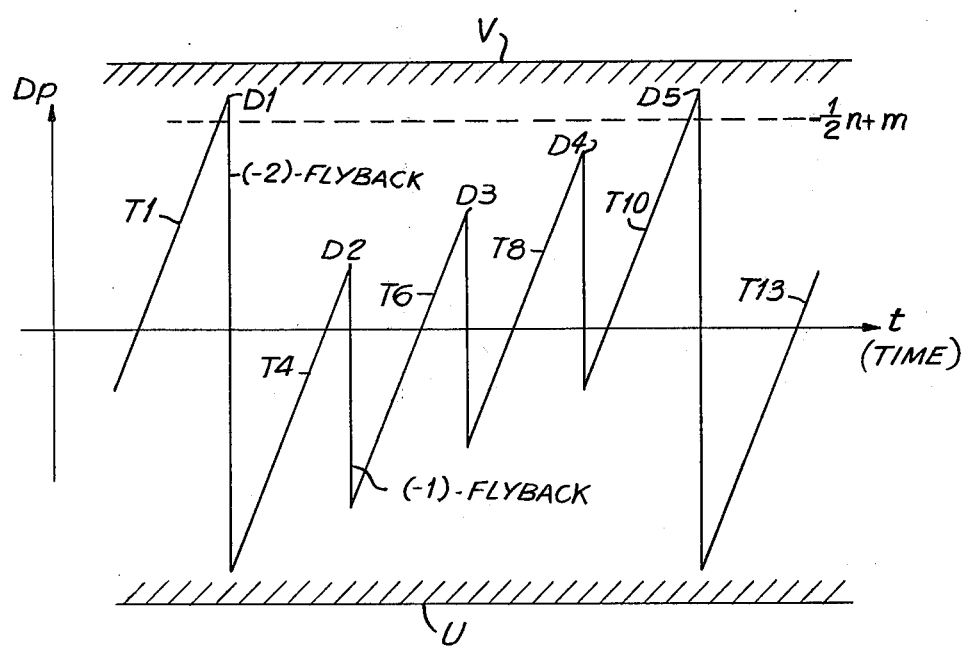
FIG. 14 is a waveform of a supply voltage applied to a bi-morph leaf for head deflection in the manner shown on FIG. 13.

FIG. 13 illustrates the tracing cycle or pattern for the 2.25/1-fast playback mode, and FIG. 14 shows the waveform of the drive voltage to be supplied to the bi-morph leaf 7 for obtaining such tracing cycle. The waveform of FIG. 14 corresponds to the head deviation.

As shown by dot-dash lines in FIG. 13, in the 2.25/1-fast playback mode, each head scanning path has a slant error of 1.25-pitches in respect to the recorded tracks $T_1, T_2$—. It is assumed that the head is deflected by $D_1$ pitches at the concluding end of the scanning of track $T_1$ for correcting the phase error and slant error, which results in the condition $D_1 > -\frac{1}{2}n+m$. Accordingly, the output a of comparator 46 of FIG. 11 is in state (2), that is, $a=0$. Accordingly, a flyback voltage $V_m$ corresponding to $m=2$ pitches is produced and is applied to bimorph leaf 7 to deflect the head 5 by $-2$ pitches onto the beginning end of the track $T_4$. Then, track $T_4$ is traced or scanned with the slant compensation of 1.25 pitches. At the concluding end of track $T_4$, the head deviation changes to $D_2$, which results in the condition $D_2 < -\frac{1}{2}n+m$. Accordingly, the output a of comparator 46 goes to state (2), that is, $a=1$. Accordingly, a flyback voltage $V_{m-1}$ corresponding to $m-1=1$ pitch is produced to cause flyback of the head 5 of $-1$ pitch onto the beginning end of the track $T_6$. After that, the scanning of a track and the flyback of $-1$ pitch are repeated two times, and then, the flyback of $-2$ pitches is carried out, as shown on FIG. 14.

Figure 15:
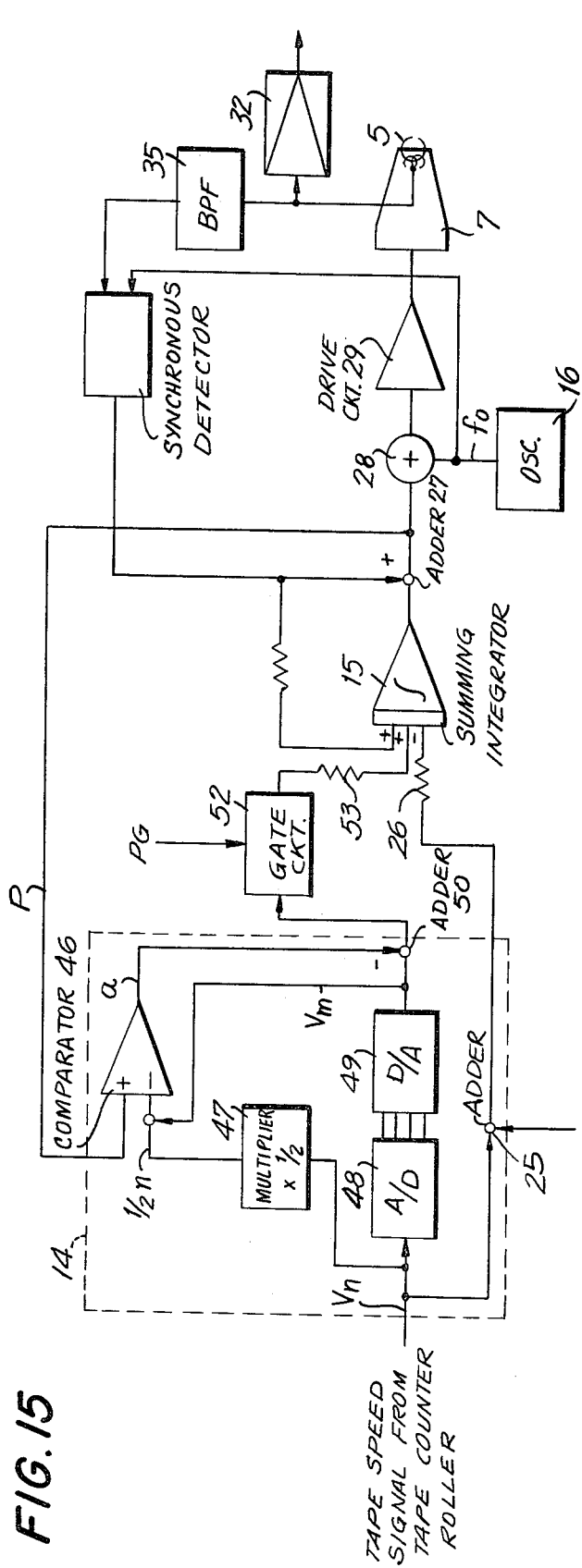
FIG. 15 is a block diagram showing another embodiment of a tracking control circuit according to this invention.

FIG. 15 is a block diagram showing another embodiment of a head tracking control circuit according to this invention, and in which like reference numerals identify the elements in FIG. 15 corresponding to those described with reference to FIG. 11.

In FIG. 15, the voltage signal $V_n$ representing the tape speed ratio n may be formed by an output signal from a frequency generator which detects the rotational speed of a tape counter roller (not shown) provided in contact with the magnetic tape to be rotated thereby, for example, for detecting the amount of the tape remaining on a supply reel. The voltage signal $V_n$ is fed to the flyback voltage forming circuit 14 in a manner similar to that described with reference to FIG. 11. In the embodiment of FIG. 15, the voltage signal $V_d$ corresponding to the head deviation $D_p$ is obtained from the output of adder 27 which contributes to the drive voltage for the bi-morph leaf 7. Such voltage signal $V_d$ is applied to our input of the comparator 46, and the track jump or head flyback is controlled on the basis of the output a of comparator 46, in a manner similar to that described with reference to FIG. 11.

Figure 16:
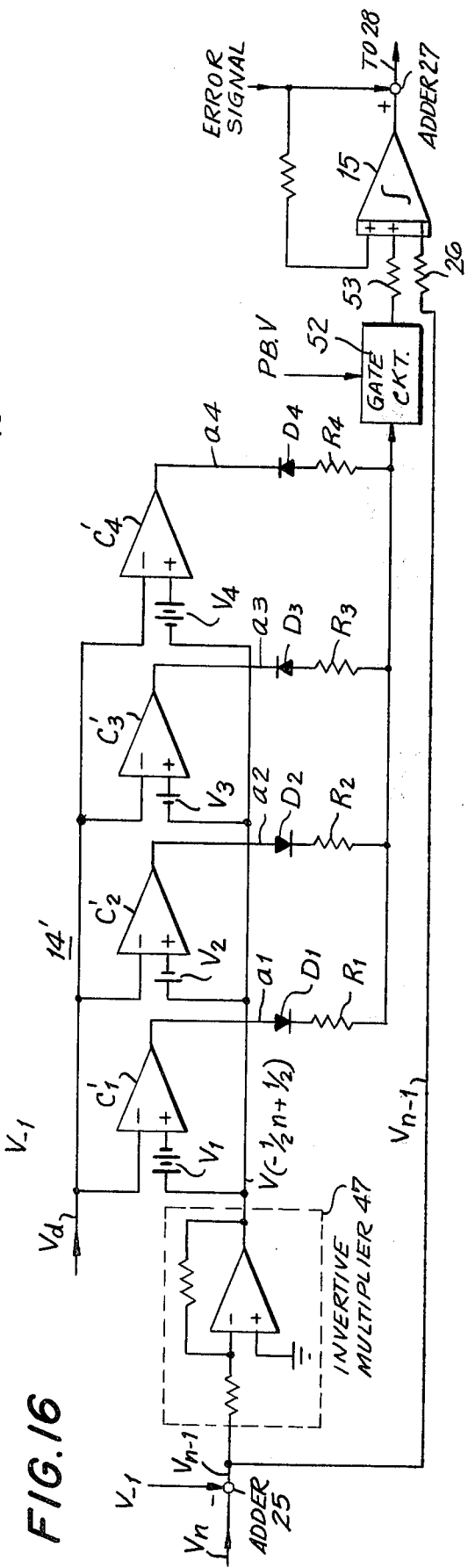
FIG. 16 is a circuit diagram showing a modification of a flyback control voltage forming circuit forming part of a tracking control circuit according to this invention.

Referring now to FIG. 16, it will be seen that, in a modification of the flyback voltage forming circuit identified generally by the reference numeral 14', the voltage $V_n$ representing the speed ratio n may be formed as in FIG. 11 or FIG. 15 and is offset to $V_{n-1}$ through the application of the voltage $V_{-1}$ in adder 25. The voltage $V_{n-1}$ is changed to another voltage corresponding to $-\frac{1}{2}n+\frac{1}{2}$ through an invertive multiplier 47'. The output of the multiplier 47' is supplied to an input terminal $(+)$ of each of comparators C1' to C4', with biases through respective bias voltage sources V1 to V4. These bias voltage sources V1, V2, V3 ad V4 have voltages $-3/2$ V, $-\frac{1}{2}$ V, $+\frac{1}{2}$ V and $+3/2$ V, respectively, where V is equal to a voltage capable of deflecting the head by one pitch. The other input terminal $(-)$ of each of the comparators C1' to C4', receives the voltage $V_d$ corresponding to the head deviation $D_p$.

Accordingly, the comparators C1' to C4' respectively perform the following comparisons:

| | |
|---|---|
| C1' | $D_p \sim -\frac{1}{2} n - 1$ |
| C2' | $D_p \sim -\frac{1}{2} n$ |
| C3' | $D_p \sim -\frac{1}{2} n + 1$ |
| C4' | $D_p \sim -\frac{1}{2} n + 2$ |

Thus, the comparators C1' to C4' discriminate the jump conditions on the basis of the boundaries represented by lines C1 to C4 on FIG. 10 for values of the speed ratio n from −1 to 3, respectively.

The comparators C1' and C2' provide outputs a1 and a2 each of which goes high "1" or low "0". The high level "1" of each of outputs a1 and a2 corresponds to a voltage capable of deflecting the head by +1 pitch. The comparators C3 and C4 provide outputs a3 and a4 each of which goes high "0" or low "−1". The low level "−1" of output a3 or a4 corresponds to a voltage capable of deflecting the head by −1 pitch. These outputs a1 to a4 are composed into respective signals through diodes D1 to D4 and resistors R1 to R4. Each of the thus composed signals is fed to integrator 15 through gate circuit 52 and resistor 53. Therefore, one or two among the comparators C1' to C4' provides an output "1" or "−1" in accordance with the speed ratio n and the head deviation $D_p$ to provide the flyback voltages by which the head is deflected +2, +1, 0, −1 or −2 pitches.

More particularly, the following combinations of outputs are formed when the head deviation is in each of the regions $F_2$, $F_1$, $F_0$, $F_{-1}$ and $F_{-2}$ on FIG. 10:

|          | a1 | a2 | a3 | a4 |
|----------|----|----|----|----|
| $F_2$    | 1  | 1  | 0  | 0  |
| $F_1$    | 0  | 1  | 0  | 0  |
| $F_0$    | 0  | 0  | 0  | 0  |
| $F_{-1}$ | 0  | 0  | −1 | 0  |
| $F_{-2}$ | 0  | 0  | −1 | −1 |

The outputs a1 to a4 are added and integrated to form the flyback voltages which is fed to the bi-morph leaf 7 to effect the track jump to the beginning of the next desired track.

The tracking control system according to this invention may be applied to the type of VTR having a pair of video heads which are circumferentially arranged at 180° intervals on the rotational drum, in addition to the single head VTR shown on FIGS. 1A and 1B.

Having described illustrative embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for reproducing information signals recorded in successive parallel tracks on a record medium while the latter is advanced at a predetermined recording speed in a direction of an angle to the direction along said tracks, said apparatus comprising:
   transducer means movable along each of the tracks in a scanning path from a beginning end to a concluding end thereof for reproducing the recorded information signals;
   transducer deflecting means for deflecting said transducer means in a direction which is transverse to said direction along the tracks;
   means for supplying a drive signal to said transducer deflecting means so as to cause said transducer means to follow a desired one of the tracks in moving from the beginning end to the concluding end of said path;
   means for producing a first signal which corresponds to the deflection of said transducer deflecting means needed to cause the transducer means to follow said desired one of the tracks at a predetermined position therealong;
   means for producing a second signal which corresponds to the value $$-\tfrac{1}{2}n + \frac{(1-n)(100-d)}{100} + m$$

in which n is the ratio of the speed of advancement of the record medium during reproducing to said recording speed, d is the percentage of the distance along each track from said beginning end to said predetermined position therealong, and m is an integer that is no greater than n and no less than n−1;
   means for detecting said speed of advancement of the record medium during reproducing;
   means responsive to said means for detecting the speed of advancement to provide to said second signal producing means a signal corresponding to said ratio n;
   means for producing a control signal on the basis of the relation of said first and second signals; and
   means for applying said control signal to said transducer deflecting means so as to determine the position of said transducer means at said beginning end of the scanning path and, thereby, the next desired track to be followed by the transducer means.

2. An apparatus for reproducing information signals recorded in successive parallel tracks on a record medium while the latter is advanced at a predetermined recording speed in a direction of an angle to the direction along said tracks, said apparatus comprising:
   transducer means movable along each of the tracks in a scanning path from a beginning end to a concluding end thereof for reproducing the recorded information signals;
   transducer deflecting means for deflecting said transducer means in a direction which is transverse to said direction along the tracks;
   means for supplying a drive signal to said transducer deflecting means so as to cause said transducer means to follow a desired one of the tracks in moving from the beginning end to the concluding end of said path;
   means for producing a first signal which corresponds to the deflection of said transducer deflecting means needed to cause the transducer means to follow said desired one of the tracks at a predetermined position therealong at which each of said tracks has a positional signal recorded therein, said means for producing the first signal including means for detecting a time base error of said positional signal as reproduced by said transducer means.
   means for producing a second signal which corresponds to the value $$-\tfrac{1}{2}n + \frac{(1-n)(100-d)}{100} + m$$

in which n is the ratio of the speed of advancement of the record medium during reproducing to said recording speed, d is the percentage of the distance along each track from said beginning end to said predetermined position therealong, and m is an integer that is no greater than n and no less n−1;

means for producing a control signal on the basis of the relation of said first and second signals; and means for applying said control signal to said transducer deflecting means so as to determine the position of said transducer means at said beginning end of the scanning path and, thereby, the next desired track to be followed by the transducer means.

3. An apparatus for reproducing information signals recorded in successive parallel tracks extending obliquely on a magnetic tape while the latter is advanced longitudinally of the tape at a predetermined recording speed, said apparatus comprising:

a guide drum of which at least a portion is rotatable with said tape extending helically about at least a part of the periphery of said drum and being adapted to be longitudinally advanced;

transducer means including a magnetic movable along each of the tracks in a scanning path from a beginning end to a concluding end thereof for reproducing the recorded information signals;

transducer deflecting means mounting said head on said rotatable portion of the guide drum so as to rotate therewith and thereby scan along a selected one of the tracks positioned in proximity thereto by advancement of the tape, said transducer deflecting means being operative for deflecting said head in a direction which is transverse to the direction along said tracks;

means for supplying a drive signal to said transducer deflecting means so as to cause said head to follow a desired one of the tracks in moving from the beginning end to the concluding end of said path, including deflection signal generating means for generating a deflection signal in correspondence to the deflection of said transducer means in said transverse direction from a rest position, oscillating means for providing a dither oscillation signal which, on application to said transducer deflection means, causes said transducer means to oscillate in said transverse direction about a null position, envelope detecting means for detecting the envelope of the output of said transducer means as the latter moves along a track and oscillates in said transverse direction, means for synchronously demodulating said detected envelope from said envelope detecting means including multiplier means having inputs receiving said detected envelope from the envelope detecting means and said deflection signal, respectively, so as to obtain a tracking error signal representative of the deviation of said null position of the transducer means from the center of the track considered in said transverse direction, and means for adding said tracking error signal and said dither oscillation signal in said drive signal for said transducer deflecting means;

means for producing a first signal which corresponds to the deflection of said transducer deflecting means needed to cause the transducer means to follow said desired one of the tracks at a predetermined position therealong;

means for producing a second signal which corresponds to the value $$-\tfrac{1}{2}n + \frac{(1-n)(100-d)}{100} + m$$

in which n is the ratio of the speed of advancement of the record medium during reproducing to said recording speed, d is the percentage of the distance along each track from said beginning end to said predetermined position therealong, and m is an integer that is no greater than n and no less than n−1;

means for producing a control signal on the basis of the relation of said first and second signals; and means for applying said control signal to said transducer deflecting means so as to determine the position of said transducer means at said beginning end of the scanning path and, thereby, the next desired track to be followed by the transducer means.

4. An apparatus for reproducing information signals recorded in successive parallel tracks on a record medium while the latter is advanced at a predetermined recording speed in a direction of an angle to the direction along said tracks, said apparatus comprising:

transducer means movable along each of the tracks in a scanning path from a beginning end to a concluding end thereof for reproducing the recorded information signals;

transducer deflecting means for deflecting said transducer means in a direction which is transverse to said direction along the tracks;

means for supplying a drive signal to said transducer deflecting means so as to cause said transducer means to follow a desired one of the tracks in moving from the beginning end to the concluding end of said path;

means for producing a first signal which corresponds to the deflection of said transducer deflecting means needed to cause the transducer means to follow said desired one of the tracks at a predetermined position therealong;

means for producing a second signal which corresponds to the value $$-\tfrac{1}{2}n + \frac{(1-n)(100-d)}{100} + m$$

in which n is the ratio of the speed of advancement of the record medium during reproducing to said recording speed, d is the percentage of the distance along each track from said beginning end to said predetermined position therealong, and m is an integer that is no greater than n and no less than n−1;

means for producing a control signal on the basis of the relation of said first and second signals;

means for applying said control signal to said transducer deflection means so as to determine the position of said transducer means at said beginning end of the scanning path and, thereby, the next desired track to be followed by the transducer means;

summing integrator means receiving said drive signal and control signal at respective inputs thereof; and adder means combining the output of said integrator means with said drive signal; and in which said first signal is derived from said adder means.

5. An apparatus for reproducing information signals recorded in successive parallel tracks on a record medium while the latter is advanced at a predetermined recording speed in a direction of an angle to the direction along said tracks, said apparatus comprising:

transducer means movable along each of the tracks in a scanning path from a beginning end to a concluding end thereof for reproducing the recorded information signals;

transducer deflecting means for deflecting said transducer means in a direction which is transverse to said direction along the tracks;

means for supplying a drive signal to said transducer deflecting means so as to cause said transducer means to follow a desired one of the tracks in moving from the beginning end to the concluding end of said path;

means for producing a first signal which corresponds to the deflection of said transducer deflecting means needed to cause the transducer means to follow said desired one of the tracks at a predetermined position therealong which is at said concluding end;

means for detecting the speed of advancement of the record medium during reproducing and providing therefrom a signal corresponding to a ratio n of the speed of advancement of the record medium during reproducing to said recording speed;

means for producing a second signal which corresponds to the value $$-\tfrac{1}{2} n + \frac{(1-n)(100-d)}{100} + m$$

in which d is the percentage of the distance along each track from said beginning end to said predetermined position therealong, and m is an integer that is no greater than n and no less than n−1, said means for producing said second signal includes means receiving said signal corresponding to the ratio n and including invertive multiplier means for providing therefrom a signal which, when applied to said transducer deflecting means is effective to deflect said transducer means by $(-\tfrac{1}{2}n+\tfrac{1}{2})$ times the pitch between adjacent tracks on the record medium, a plurality of comparators each having a first input receiving said first signal and a second input, a plurality of different bias voltage sources through which the output of said invertive multiplier means is applied to said second inputs of the respective comparators, and means for combining the compared outputs of said comparators;

means for producing a control signal on the basis of the relation of said first and second signals; and means for applying said control signal to said transducer deflecting means so as to determine the position of said transducer means at said beginning end of the scanning path and, thereby, the next desired track to be followed by the transducer means.

6. An apparatus for reproducing video signals including horizontal and vertical synchronizing signals and being recorded in successive parallel tracks on a record medium while the latter is advanced at a predetermined recording speed in a direction of an angle to the direction along said tracks, said apparatus comprising:

transducer means movable along each of the tracks in a scanning path from a beginning end to a concluding end thereof for reproducing the recorded video signals;

transducer deflecting means for deflecting said transducer means in a direction which is transverse to said direction along the tracks;

means for supplying a drive signal to said transducer deflecting means so as to cause said transducer means to follow a desired one of the tracks in moving from the beginning end to the concluding end of said path;

means for producing a first signal which corresponds to the deflection of said transducer deflecting means needed to cause the transducer means to follow said desired one of the tracks at a predetermined position therealong;

means for producing a second signal which corresponds to the value $$-\tfrac{1}{2} n + \frac{(1-n)(100-d)}{100} + m$$

in which n is the ratio of the speed of advancement of the record medium during reproducing to said recording speed, d is the percentage of the distance along each track from said beginning end to said predetermined position therealong, and m is an integer that is no greater than n and no less than n−1;

means for producing a control signal on the basis of the relation of said first and second signals;

means for applying said control signal to said transducer deflecting means so as to determine the position of said transducer means at said beginning end of the scanning path and, thereby, the next desired track to be followed by the transducer means;

means responsive to the reproduced horizontal synchronizing signals for detecting said speed of advancement of the record medium during reproducing; and means responsive to said means for detecting said speed of advancement to provide to said second signal producing means a signal corresponding to said ratio n.

7. An apparatus according to claim 6; in which each of said tracks has one of said vertical synchronizing signals recorded therein at said predetermined position therealong, and said means for producing the first signal includes means for detecting a time base error of said vertical synchronizing signal as reproduced by said transducer means.

8. An apparatus for reproducing information signals recorded in successive parallel tracks on a record medium while the latter is advanced at a predetermined recording speed in a direction of an angle to the direction along said tracks which are recorded with a predetermined pitch therebetween, said apparatus comprising:

transducer means movable along each of the tracks in a scanning path from a beginning end to a concluding end thereof for reproducing the recorded information signals;

transducer deflecting means for deflecting said transducer means in a direction which is transverse to said direction along the tracks;

means for producing a signal corresponding to a ratio n of the speed of advancement of the record medium during reproducing to said recording speed;

means for supplying a drive signal to said transducer deflecting means so as to cause said transducer means to follow a desired one of the tracks in moving from the beginning end to the concluding end of said path including a bias voltage source, and adding means for applying the bias voltage from said source to said signal corresponding to the ratio n so as to obtain a signal corresponding to a deflection of (n−1) pitches of said transducer means when applied to said transducer deflecting means;

means for producing a first signal which corresponds to the deflection of said transducer deflecting means needed to cause the transducer means to follow said desired one of the tracks at a predetermined position therealong;

means for producing a second signal which corresponds to the value $$-\tfrac{1}{2}n + \frac{(1-n)(100-d)}{100} + m$$

in which d is the percentage of the distance along each track from said beginning end to said predetermined position therealong, and m is an integer that is no greater than n and no less than n−1;

means for producing a control signal on the basis of the relation of said first and second signals; and means for applying said control signal to said transducer deflecting means so as to determine the position of said transducer means at said beginning end of the scanning path and, thereby, the next desired track to be followed by the transducer means.

9. An apparatus according to claim 8; in which said means for supplying a drive signal further includes means for producing a tracking error signal representative of the deviation of said transducer means from the center of a track being scanned; and said means for applying said control signal to said transducer deflecting means includes summing integrator means having inputs respectively receiving said tracking error signal, said signal corresponding to a deflection of (n−1) pitches and said control signal.

10. An apparatus for reproducing information signals recorded in successive parallel tracks on a record medium while the latter is advanced at a predetermined recording speed in a direction of an angle to the direction along said tracks, said apparatus comprising:

transducer means movable along each of the tracks in a scanning path from a beginning end to a concluding end thereof for reproducing the recorded information signals;

transducer deflecting means for deflecting said transducer means in a direction which is transverse to said direction along the tracks;

means for supplying a drive signal to said transducer deflecting means so as to cause said transducer means to follow a desired one of the tracks in moving from the beginning end to the concluding end of said path;

means for detecting said speed of advancement of the record medium during reproducing and providing therefrom a signal corresponding to a ratio of the speed of advancement of the record medium during reproducing to said recording speed;

means for producing a first signal which corresponds to the deflection of said transducer deflecting means needed to cause the transducer means to follow said desired one of the tracks at a predetermined position therealong which is at said concluding end;

means for producing a second signal which corresponds to the value $$-\tfrac{1}{2}n + \frac{(1-n)(100-d)}{100} + m$$

in which n is said ratio of the speed of advancement of the record medium during reproducing to said recording speed, d is the percentage of the distance along each track from said beginning end to said predetermined position therealong, and m is an integer that is no greater than n and no less than n−1, including means for producing a signal corresponding to said integer m from said signal corresponding to the ratio n, multiplier means for multiplying by ½ said signal corresponding to the ratio n, and adder means for adding said signal corresponding to the integer m to the output of said multiplier means;

means for producing a control signal on the basis of the relation of said first and second signals; and means for applying said control signal to said transducer deflecting means so as to determine the position of said transducer means at said beginning end of the scanning path and, thereby, the next desired track to be followed by the transducer means.

11. An apparatus according to claim 10; in which said means for producing a control signal comprises comparator means for comparing said first signal with the output of said adder means and, on the basis of such comparison, providing an output at a corresponding level, and means for adding said output of the comparator to said signal corresponding to the integer m.

12. An apparatus according to claim 11; in which said means for applying said control signal to said transducer deflecting means includes gate means receiving said control signal and being made to conduct the latter just before said transducer means arrives at said beginning end of said scanning path.

13. An apparatus for reproducing information signals recorded in successive parallel tracks on a record medium while the latter is advanced at a predetermined recording speed in a direction of an angle to the direction along said tracks, each of said tracks further having a positional signal recorded therein at a predetermined position therealong, said apparatus comprising:

transducer means movable along each of the tracks in a scanning path from a beginning end to a concluding end thereof for reproducing the recorded information signals;

transducer deflecting means for deflecting said transducer means in a direction which is transverse to said direction along the tracks;

means for supplying a drive signal to said transducer deflecting means so as to cause said transducer means to follow a desired one of the tracks in moving from the beginning end to the concluding end of said path;

means for producing a first signal which corresponds to the deflection of said transducer deflecting means needed to cause the transducer means to follow said desired one of the tracks at predetermined position therealong;

said means for producing the first signal including a source of external reference signals comparable with said positional signals, and means for comparing each of said positional signals reproduced by said transducer means with a respective one of said external reference signals and providing a corresponding detected time base error signal as a function of said deflection of said transducer deflecting means at said predetermined position;

means for producing a second signal which corresponds to the value $$-\tfrac{1}{2}n + \frac{(1-n)(100-d)}{100} + m$$

in which n is the ratio of the speed of advancement of the record medium during reproducing to said recording speed, d is the percentage of the distance along each track from said beginning end to said predetermined position therealong, and m is an integer that is no greater than n and no less than n−1;

means for producing a control signal on the basis of the relation of said first and second signals; and means for applying said control signal to said transducer deflecting means so as to determine the position of said transducer means at said beginning end of the scanning path and, thereby, the next desired track to be followed by the transducer means.

14. An apparatus according to claim 13; in which said record medium is a magnetic tape having said tracks extending obliquely thereon and adapted to be longitudinally advanced, said transducer means includes a magnetic head mounted by means of said transducer deflecting means on a support which is movable for causing said head to repeatedly scan across said tape in a direction generally along said tracks, and means are provided for transmitting said control signal to said transducer deflecting means so that the latter is deflected by said control signal in the intervals between successive scans by said head.

15. An apparatus according to claim 14; in which said information signals are video signals which include vertical synchronizing signals, and said video signals are recorded in said tracks so that a vertical synchronizing signal is recorded at said predetermined position along each of said tracks to constitute said positional signal thereof; and in which said external reference signals are timed in respect to movements of said support for causing the repeated scanning across said tape by said head.

16. An apparatus according to claim 15; in which said means for comparing includes a source of clock pulses, counting means initiated by each said external reference signal for counting said clock pulses, latch means actuated by each said vertical synchronizing signal reproduced by said head for latching the count of said counting means, and digital-to-analog converting means for providing said time base error signal from the latched content of said latching means.

17. An apparatus according to claim 15; in which said video signals further include horizontal synchronizing signals recorded, with predetermined intervals, in each of said tracks; and further comprising a source of clock pulses, counting means initiated by each of said horizontal synchronizing signals are reproduced by said head for counting said clock pulses, latch means actuated by each of the reproduced horizontal synchronizing signals for latching the count of said clock pulses by said counting means in the preceding interval, and digital-to-analog converting means for providing a signal corresponding to said ratio n from the latched content of said counting means.

18. An apparatus for reproducing information signals recorded in successive parallel tracks on a record medium while the latter is advanced at a predetermined recording speed in a direction of an angle to the direction along said tracks, said apparatus comprising:

transducer means movable along each of the tracks in a scanning path from a beginning end to a concluding end thereof for reproducing the recorded information signals;

transducer deflecting means for deflecting said transducer means in a direction which is transverse to said direction along the tracks;

means for supplying a drive signal to said transducer deflecting means so as to cause said transducer means to follow a desired one of the tracks in moving from the beginning end to the concluding end of said path;

means for producing a first signal which corresponds to the deflection of said transducer deflecting means needed to cause the transducer means to follow said desired one of the tracks at a predetermined position therealong;

means for producing a continuously variable second signal which corresponds to the value $$-\tfrac{1}{2}n + \frac{(1-n)(100-d)}{100} + m$$

in which n is the ratio of the speed of advancement of the record medium during reproducing to said recording speed, d is the percentage of the distance along each track from said beginning end to said predetermined position therealong, and m is an integer that is no greater than n and no less than n−1;

means for producing a control signal on the basis of the relation of said first and second signals; and means for applying said control signal to said transducer deflecting means so as to determine the position of said transducer means at said beginning end of the scanning path and, thereby, the next desired track to be followed by the transducer means.

19. An apparatus according to claim 1; in which said means for applying said control signal to said transducer deflecting means includes gate means which is made to conduct just before said transducer means arrives at said beginning end of said scanning path.

20. An apparatus according to claim 18; in which said record medium is a magnetic tape having said tracks extending obliquely thereon, said tape extends helically about at least a portion of the periphery of a guide drum and is adapted to be longitudinally advanced, at least a portion of said guide drum is rotatable, and said transducer means includes a magnetic head mounted by means of said transducer deflecting means on said rotatable portion of the guide drum so as to rotate with the latter and thereby scan along a selected one of the tracks positioned in proximity thereto by advancement of the tape.

21. An apparatus according to claim 20; in which said means for supplying said drive signal includes deflection signal generating means for generating a deflection signal in correspondence to the deflection of said transducer means in said transverse direction from a rest position, oscillating means for providing a dither oscillation signal which, on application to said 22. An apparatus according to claim 21; in which said transducer deflecting means is constituted by a bi-morph leaf which is cantilevered at one end and has said transducer means secured to the other end of said leaf, and said drive signal is applied to said bi-morph leaf for flexing the same and thereby causing the deflection in said transverse direction.

23. An apparatus according to claim 22; in which said deflection signal generating means includes a strain gauge secured on said bi-morph leaf so as to be stressed in accordance with the flexing of said leaf.

* * * * *